US010902837B2

(12) United States Patent
Garudadri et al.

(10) Patent No.: US 10,902,837 B2
(45) Date of Patent: Jan. 26, 2021

(54) SPARSITY-AWARE ADAPTIVE FEEDBACK CANCELLATION

(71) Applicant: The Regents of the University of California, Oakland, CA (US)

(72) Inventors: Harinath Garudadri, La Jolla, CA (US); Ching-Hua Lee, La Jolla, CA (US); Bhaskar Rao, La Jolla, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/641,448

(22) PCT Filed: Aug. 27, 2018

(86) PCT No.: PCT/US2018/048171
§ 371 (c)(1),
(2) Date: Feb. 24, 2020

(87) PCT Pub. No.: WO2019/040942
PCT Pub. Date: Feb. 28, 2019

(65) Prior Publication Data
US 2020/0202835 A1 Jun. 25, 2020

Related U.S. Application Data

(60) Provisional application No. 62/550,166, filed on Aug. 25, 2017.

(51) Int. Cl.
*H04B 15/00* (2006.01)
*G10K 11/178* (2006.01)

(52) U.S. Cl.
CPC .. *G10K 11/17854* (2018.01); *G10K 11/17875* (2018.01); *G10K 2210/3026* (2013.01); *G10K 2210/3028* (2013.01)

(58) Field of Classification Search
CPC ..... G10K 11/17854; G10K 2210/3026; H04M 9/082
(Continued)

(56) References Cited

U.S. PATENT DOCUMENTS

2002/0054634 A1 5/2002 Martin
2006/0291681 A1 12/2006 Klinkby
(Continued)

*Primary Examiner* — George C Monikang
(74) *Attorney, Agent, or Firm* — Stuart H. Mayer; Mayer & Williams PC

(57) ABSTRACT

A signal processing device comprises: input transducer(s) configured to convert input(s) to an input signal; output transducer(s) configured to convert an output signal to output(s); a signal processing circuit configured to at least subtract a feedback estimation signal from the input signal to produce a feedback compensated signal; and an adaptive feedback estimator. The adaptive feedback estimator comprises processor(s) and machine readable medium(s) collectively comprising instructions configured to cause the processor(s) to: estimate feedback path characteristic(s); construct an adaptive feedback cancellation filter based at least in part on the feedback path characteristic(s); select a value for variable p in a diversity measure norm; compute an update rule for the adaptive feedback cancellation filter, the update rule based on the diversity measure norm; apply the update rule to the adaptive feedback cancellation filter; and generate the feedback estimation signal through employment of the adaptive feedback cancellation filter on the output signal.

32 Claims, 14 Drawing Sheets

(58) Field of Classification Search
USPC .............................................. 381/93, 95–96
See application file for complete search history.

(56) References Cited

U.S. PATENT DOCUMENTS

| | | |
|---|---|---|
| 2011/0150257 A1 | 6/2011 | Jensen |
| 2013/0070936 A1 | 3/2013 | Jensen et al. |
| 2017/0188147 A1 | 6/2017 | Da Silva Freitas et al. |

$$\|\mathbf{v}\|_p = \left( \sum_{i=0}^{L-1} |v_i|^p \right)^{\frac{1}{p}}, \text{ where}$$

700 vector $\mathbf{v} = [v_0, v_1, \ldots, v_{L-1}]^T$, and $0 < p <= 2$

FIG. 7

$$\mathbf{w} = [w_0, w_1, \ldots, w_{L-1}]^T$$

$$\mu(n) = \frac{\mu}{L\hat{\sigma}^2(n) + \varepsilon}$$

900 where $\hat{\sigma}^2(n) = \rho \hat{\sigma}^2(n-1) + (1-\rho)(u'^2(n) + e'^2(n))$

FIG. 9

$$\mathbf{P}(n) = diag\{p_0(n), p_1(n), \ldots, p_{L-1}(n)\}$$

where $p_l(n) = \dfrac{\||w_l(n)| + c|^{2-p}}{\frac{1}{L}\sum_{i=0}^{L-1}\||w_i(n)| + c|^{2-p}}$, and where the $l_1$ norm of a vector $\mathbf{v} = [v_0, v_1, \ldots, v_{L-1}]^T$ is defined by $\|\mathbf{v}\|_1 = \sum_{i=0}^{L-1}|v_i|$

FIG. 10

$$\mathbf{u}'(n) = [u'(n), u'(n-1), \ldots, u'(n-L+1)]^T$$

FIG. 11

$$\xi(\mathbf{w}) = \frac{L}{L-\sqrt{L}}\left(1 - \frac{\|\mathbf{w}\|_1}{\sqrt{L}\,\|\mathbf{w}\|_2}\right), \text{ where } \mathbf{w} = [w_0, w_1, \ldots, w_{L-1}]^T \text{ is a vector of length } L$$

FIG. 12

$$lb_j \leq \xi(\mathbf{w}) < ub_j, \quad j = 1, 2, \ldots, J.$$

FIG. 13

SPARSITY-AWARE ADAPTIVE FEEDBACK CANCELLATION

CROSS-REFERENCE TO RELATED APPLICATIONS

This application is a National Stage in the US of PCT/US18/48171, filed Aug. 27, 2018 which claims the benefit of priority of U.S. Provisional Patent Application Ser. No. 62/550,166, filed Aug. 25, 2017, entitled "SPARSITY-AWARE ADAPTIVE FEEDBACK CANCELLATION", owned by the assignee of the present application and herein incorporated by reference in its entirety.

STATEMENT OF GOVERNMENT INTEREST

This invention was made with Government support under DC015436—awarded by the National Institutes of Health. The Government has certain rights in the invention.

BACKGROUND

In many current devices and systems comprising inputs such as microphones and outputs such as speakers, acoustic feedback from the output causes distortion at the input, especially when the output is an amplified version of the input. Many adaptive feedback cancellation (AFC) systems and methods attempt to estimate variations in a feedback path so that an estimated feedback signal can be generated and subtracted from an input signal prior to processing (e.g. amplification).

Least mean square (LMS) algorithms are widely used to adjust or adapt the coefficients of AFC filters. However, estimates produced by many LMS systems and methods may be biased due to correlation between the input signal and a feedback signal. Many filtered-X LMS (FXLMS) systems and methods employ a pre-filter to reduce the correlation. Many FXLMS systems and methods employ a band-limited filter to concentrate on frequency regions where oscillations occur. However, many FXLMS systems and methods may be slow to adapt across highly time-varying feedback paths. Many prediction-error-method (PEM) systems and methods update a pre-filter using linear prediction of a feedback compensated signal. However, computational complexity may be high in many PEM systems and methods. Feedback tracking and estimation performance may be improved in many PEM systems and methods. Many normalized LMS (NLMS) systems and methods employ a step size normalized by a power estimate of the input. However, many NLMS systems and methods may become unstable for correlated signals such as tonal signals in the input. Many NLMS systems and methods may not be able to provide high adaptation speed and maintain a low steady-state error simultaneously. Many proportionate NLMS (PNLMS) systems and methods are applied when underlying systems are very sparse. However, many PNLMS systems and methods may not improve feedback cancellation on channels that are quasi-sparse. When large amplification is desired, many PNLMS systems and methods may be slow to adapt to varying feedback paths.

Many feedback path impulse responses are quasi-sparse in the time domain. Many feedback path impulse responses may experience a variety of sparsity levels. What is needed are devices and systems configured for sparsity-aware adaptive feedback cancellation.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

Systems and methods according to present principles are directed towards improved dynamic or updated least mean square adaptive filtering algorithms. The same may be implemented in a number of applications, including feedback cancellation and hearing aids. In one implementation, a feedback cancellation signal processing device includes: input transducer(s) configured to convert input(s) to an input signal; output transducer(s) configured to convert an output signal to output(s); a signal processing circuit configured to at least subtract a feedback estimation signal from the input signal to produce a feedback compensated signal; and an adaptive feedback estimator. The adaptive feedback estimator comprises processor(s) and machine readable medium(s) collectively comprising instructions configured to cause the processor(s) to: estimate feedback path characteristic(s); construct an adaptive feedback cancellation filter based at least in part on the feedback path characteristic(s); select a value for variable p in a diversity measure norm; compute an update rule for the adaptive feedback cancellation filter, the update rule based on the diversity measure norm; apply the update rule to the adaptive feedback cancellation filter; and generate the feedback estimation signal through employment of the adaptive feedback cancellation filter on the output signal.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

FIG. 7 illustrates an example equation for defining a diversity measure norm as employed in various embodiments.

FIG. 8 illustrates an example equation for defining an L-tap AFC filter w as employed in various embodiments.

FIG. 9 illustrates an example equation for defining a step size parameter μ as employed in various embodiments.

FIG. 10 illustrates an example equation for defining an L-by-L diagonal matrix P as employed in various embodiments.

FIG. 11 illustrates an example equation for defining a data vector consisting of current and past L−1 samples of a pre-filtered output signal u' as employed in various embodiments.

FIG. 12 illustrates an example equation for defining a sparsity score ζ as employed in various embodiments.

FIG. 13 illustrates an example equation for defining a range of sparsity degree as employed in various embodiments.

DETAILED DESCRIPTION

Systems and methods according to present principles are directed to improved algorithms employing special LMS methods that employ updating functionality. Two examples are provided below, although other examples will also be understood given the description that follows, including the figures and claims. The examples are in the field of adaptive feedback cancellation and beamforming.

Adaptive filters have been a research topic of interest for decades and have many potential applications such as in acoustic echo cancellation, active noise cancellation, channel equalization, speech processing, image processing, radar signal processing, among others. The most well-known adaptive filtering algorithms are the least mean squares (LMS) and the normalized LMS (NLMS) algorithms, which have been deployed in many practical applications due to their simplicity and effectiveness. In several applications, the impulse responses (IRs) that need to be identified are often sparse; i.e., when only a small percentage of the IR components have a significant magnitude while the rest are zero or small, such as in network and acoustic echo cancellation, in hands free mobile telephony, or in hearing aids to deal with acoustic echo channel caused by coupling between the microphone and loudspeaker, to mention a few. Designing adaptive filters that can exploit the sparse structure in the underlying system response to achieve better performance has been an area of great interest in the past decade.

Inspired by the reweighted $l_2$ and $l_1$ algorithms developed in the sparse signal recovery area, present systems and method provide corresponding adaptive filtering algorithms that attempt to impose and take advantage of the sparsity structure in the adaptive filter coefficients. In more detail, inspired by the similarity between the problems of sparse system identification and sparse signal recovery (SSR), a framework is presented for rigorously deriving a family of adaptive filters that exploit sparsity in the estimated filter responses. The framework is flexible and permits incorporation of various sparsity levels inducing diversity measures that have proven effective for SSR. Under this framework, least mean square (LMS) and normalized LMS (NLMS) type sparse adaptive filtering algorithms are derived using the well-known reweighted $l_2$ and $l_1$ SSR techniques. Furthermore, by setting the regularization coefficient of the sparsity penalty term to zero in the resulting algorithms, the sparsity promoting LMS (SLMS) and sparsity promoting NLMS (SNLMS) are introduced, which exploit, though not enforce, the sparsity of the system response if it already exists.

Figure 1A:
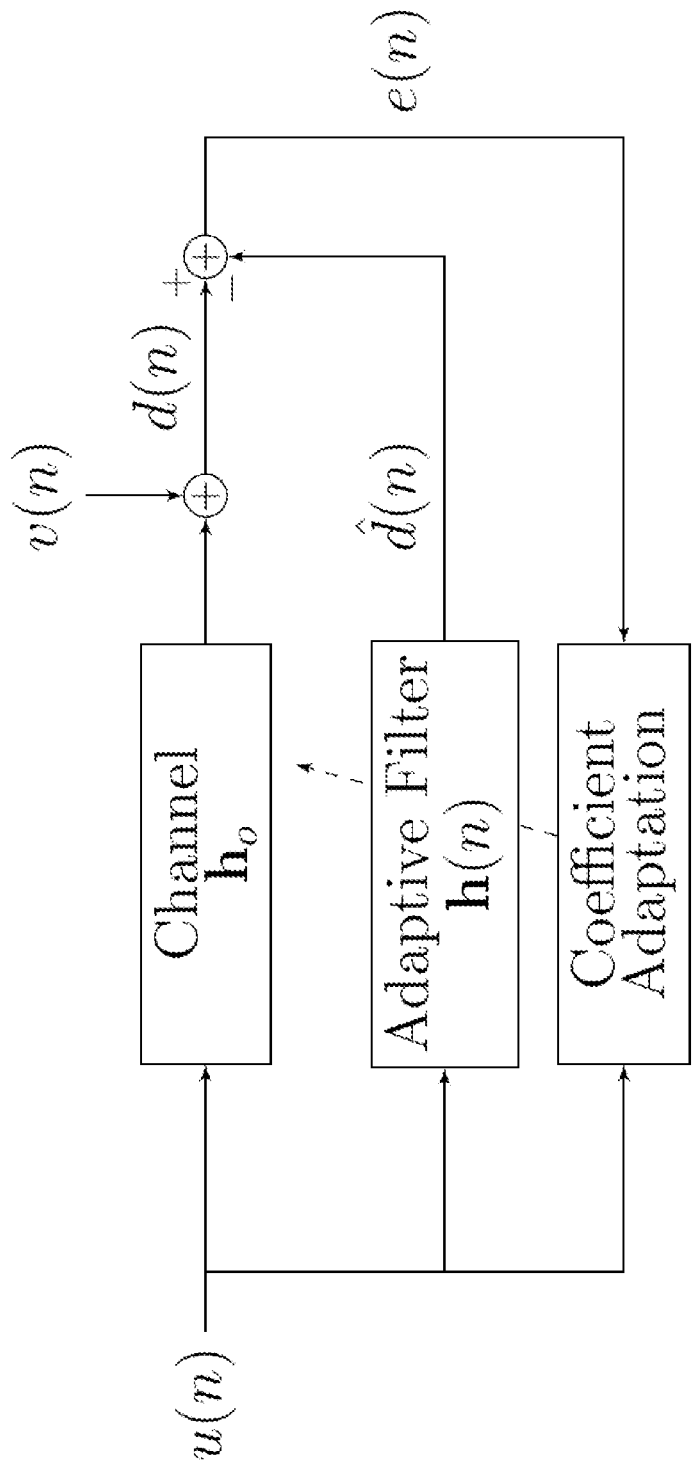
FIG. 1A is an example block diagram showing a signal processing device as per an aspect of an embodiment.

FIG. 1A depicts the system identification framework. Let n denote the discrete time index. The adaptive filter 14 is given by $h(n)=[h_0(n), h_1(n), \ldots, h_{L-1}(n)]^T$ at time n, which is a finite impulse response (FIR) filter of length L. The IR of the underlying channel 12 is $h_o=[h_{o1}, h_{o2}; \ldots h_{oL-1}]^T$. The observed or desired signal is:

$$d(n) = \mathbf{h}_o^T u(n) + v(n),$$

$u(n)=[u(n), u(n-1), \ldots, u(n-L+1)]^T$ is the vector containing the L most recent input samples and v(n) is an additive noise signal. The output of the adaptive filter $\hat{d}(n)=h^T(n)u(n)$ is subtracted from d(n) to obtain the error signal $e(n)=d(n)-\hat{d}(n)$. The goal in general is to continuously adjust the coefficients of h(n) (see coefficient adaptation 16) such that eventually $h(n)=h_o$, i.e., to identify the unknown channel IR.

The performance of the SLMS and SNLMS algorithms for channel IRs with different sparsity levels has been demonstrated. An important observation is that for a system with a certain degree of sparsity, it is possible to achieve better adaptation performance than using the ordinary LMS or NLMS, by incorporating flexible diversity measures to promote sparsity via the proposed framework. Parameters are given for the proposed algorithms to provide them the ability to control the adaptation speed according to different sparsity degrees. Therefore, even if the underlying channel is not extremely sparse, as is common in practice, the algorithms can still benefit from certain sparsity exploitation presented in the structure.

One application example is the adaptive feedback cancellation (AFC) problem for hearing aids, where the acoustic feedback path IRs are usually quasi-sparse, and therefore neither the PNLMS nor the LMS/NLMS is the best choice for this kind of problem. Certain proposed algorithms, on the other hand, can be suitable for this quasi-sparsity with proper choices of the parameters. Indeed, in previous work for the AFC application, improvement of 5 dB added stable gain (ASG) over the NLMS was obtained with a p of 1.5 for the used algorithm which is similar to the 'p "norm" based algorithms using reweighted 12. Furthermore, tested with acoustic feedback IRs measured from real-world settings, it was shown that the AFC performance was not sensitive to the value of p in the range of 1.4 to 1.6. That is, the method is not very sensitive to the choice of p.

It is noted that p=2 corresponds to traditional LMS; p=1 corresponds to the proportionate NLMS (PNLMS); p greater than 0 and less than or equal to 2 forms a general class. p around the value of 1.3 to 1.5 has been found optimal for speech signals, including use cases such as acoustic feedback, echo cancellation, or wideband beamforming for speech signals. In general a value of p not equal to 1 or 2 has been found appropriate. It is noted that systems and methods according to present principles provide a general framework with an adjustable p in the range p>0 and p<=2 for fitting different sparsity.

Embodiments are now described addressing this first specific application, i.e., configured to perform sparsity-aware adaptive feedback cancellation. Sparsity-aware adaptive feedback cancellation may promote sparsity in an estimated feedback path for improved performance in adaptive feedback cancellation. Sparsity-aware adaptive feedback cancellation may promote sparsity over a wider range of sparsity degree for improved effectiveness of adaptive feedback cancellation in a wider range of environments. Sparsity-aware adaptive feedback cancellation may be configured to adapt more quickly to varying feedback paths.

Figure 1B:
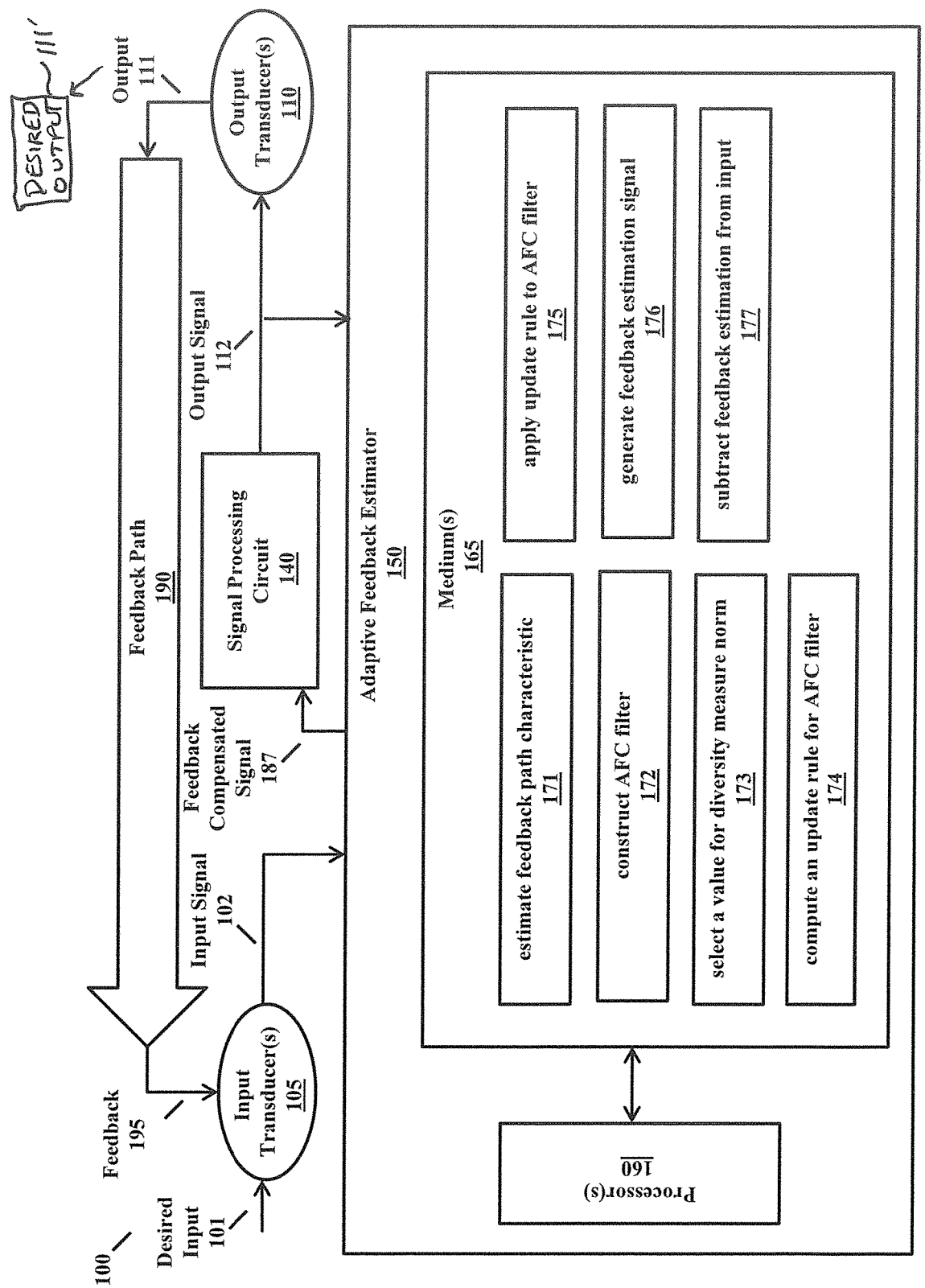
FIG. 1B is an example block diagram showing a signal processing device as per an aspect of an embodiment.

FIG. 1B is an example block diagram showing a signal processing device 100 as per an aspect of an embodiment. Signal processing device 100 may comprise at least one input transducer 105. The at least one input transducer 105 may be configured to convert an input to an input signal 102. A microphone may comprise the at least one input transducer 105. The input may comprise at least a desired input 101 and feedback 195. The feedback 195 may comprise at least a modified or unmodified portion of an output 111 (desired output 111' is also shown). The output 111 may propagate wirelessly through a feedback path 190. Propagation of the output 111 through the feedback path 190 may cause modification (e.g. attenuation, interference, and/or phase shifting) of at least a portion of the output 111. The input signal 102 may, for example, comprise an audio signal, a speech signal, a sensor signal, harmonics thereof, combinations thereof, and/or the like. The signal processing device 100 may comprise at least one output transducer 110. The at least one output transducer 110 may be configured to convert an output signal 112 to the output 111. The output 111 may, for example, comprise audio, speech, physical artifacts sensed by the input transducer 105, combinations thereof, and/or the like. The signal processing device 100 may comprise a signal processing circuit 140. The signal processing circuit 140 may be configured to at least amplify at least a portion of a feedback compensated signal 187 to generate the output signal 112. The signal processing device 100 may comprise an adaptive feedback estimator 150. The adaptive feedback estimator 150 may comprise at least one processor 160. The adaptive feedback estimator 150 may comprise at least one machine readable medium 165. The at least one machine readable medium 165 may collectively comprise instructions configured to cause the at least one processor 160 to estimate at least one feedback path characteristic at block 171. The instructions may be further configured to cause the at least one processor 160 to construct an adaptive feedback cancellation (AFC) filter at block 172. The AFC filter may be a finite impulse response filter (FIR). The AFC filter may be based at least in part on the at least one feedback path characteristic. The instructions may be further configured to cause the at least one processor 160 to select a value for variable p in a diversity measure norm at block 173. The value may be greater than 0 and less than or equal to 2. The instructions may be further configured to cause the at least one processor 160 to compute an update rule for the AFC filter at block 174. The update rule may be based on the diversity measure norm. The instructions may be further configured to cause the at least one processor 160 to apply the update rule to the AFC filter at block 175. The instructions may be further configured to cause the at least one processor 160 to generate a feedback estimation signal through employment of the AFC filter on the output signal 112 at block 176. The instructions may be further configured to cause the at least one processor 160 to subtract the feedback estimation signal from the input signal 102 to produce the feedback compensated signal 187 at block 177.

It is noted in this regard that the step 171 of estimating the feedback path characteristic is useful in accomplishing initialization of the AFC filter and selection of the p value of diversity measure, and can be performed by techniques including averaging multiple measured feedback path impulse responses and their sparsity degrees (of a particular device). The step 172 of constructing the AFC filter is to initialize an FIR filter for estimating feedback signals. The step 173 of selecting a value for a diversity measure norm is useful in accomplishing leveraging sparsity in the feedback path impulse responses. The step 174 of computing an update rule for an AFC filter is useful in accomplishing tracking the changes of the acoustic feedback environment and can be performed by techniques including LMS, NLMS, PNLMS, SLMS, and SNLMS. The step 175 of applying the update rule to AFC filter is useful in accomplishing the AFC filter update and can be performed by techniques including stochastic gradient descent or Newton's method. The step 176 of generating a feedback estimation signal is useful in accomplishing producing a feedback signal estimate and can be performed by techniques including convolution in time domain. Finally, the step 177 of subtract feedback estimation from input is useful in accomplishing a cancellation of the feedback component in the input signal and can be performed by techniques including subtraction.

Figure 2:
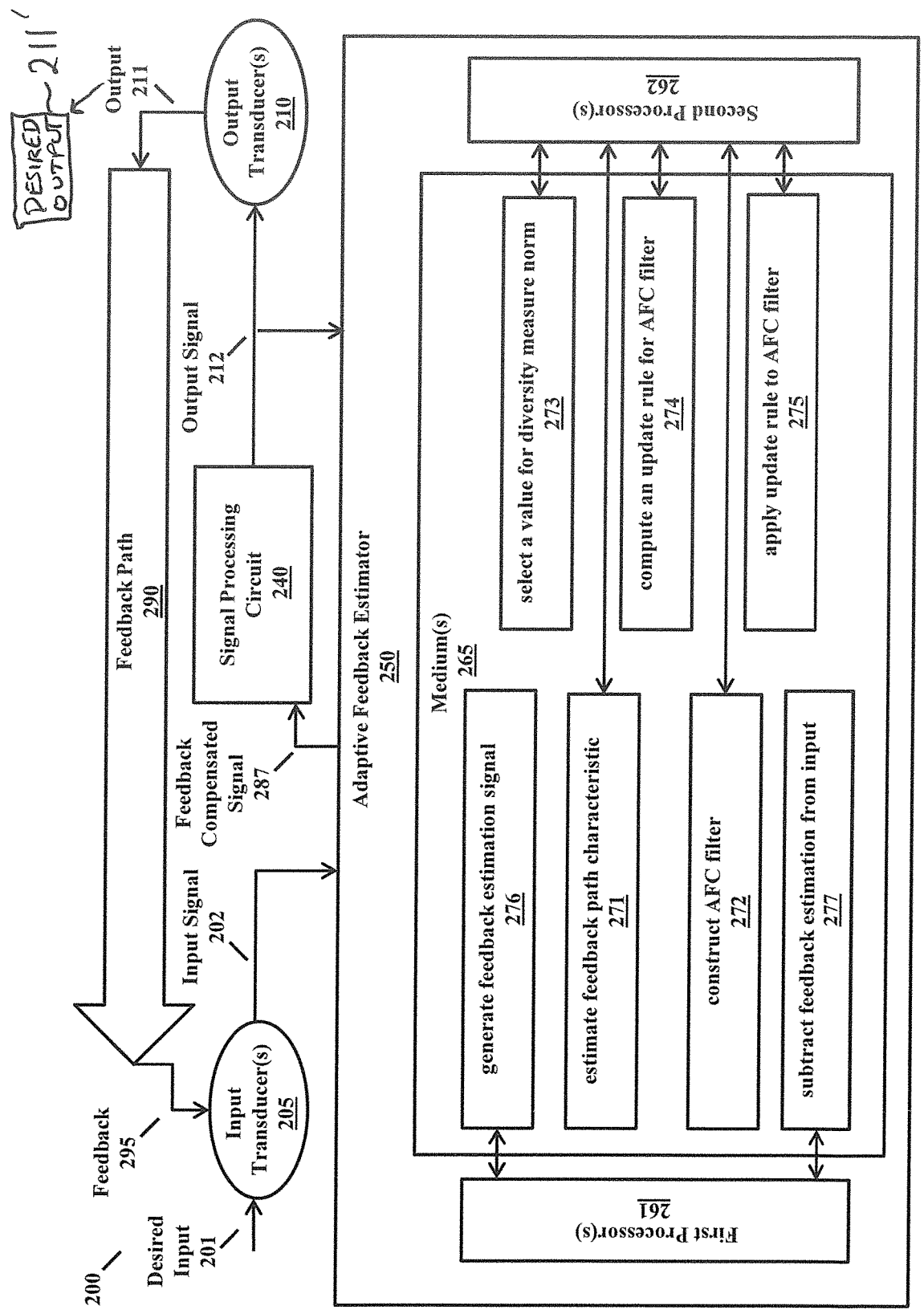
FIG. 2 is an example block diagram showing a signal processing device as per an aspect of an embodiment.

FIG. 2 is an example block diagram showing a signal processing device 200 as per an aspect of an embodiment. Signal processing device 200 may comprise at least one input transducer 205. The at least one input transducer 205 may be configured to convert an input to an input signal 202. The input may comprise at least a desired input 201 and feedback 295. The feedback 295 may comprise at least a modified or unmodified portion of an output 211 (desired output 211' is also shown). The output 211 may propagate wirelessly through a feedback path 290. Propagation of the output 211 through the feedback path 290 may cause modification (e.g. attenuation, interference, and/or phase shifting) of at least a portion of the output 211. The input signal 202 may, for example, comprise an audio signal, a speech signal, a sensor signal, harmonics thereof, combinations thereof, and/or the like. The signal processing device 200 may comprise at least one output transducer 210. The at least one output transducer 210 may be configured to convert an output signal 212 to the output 211. The output 211 may, for example, comprise audio, speech, physical artifacts sensed by the input transducer 205, combinations thereof, and/or the like. The signal processing device 210 may comprise a signal processing circuit 240. The signal processing circuit 240 may be configured to at least amplify at least a portion of a feedback compensated signal 287 to generate the output signal 212. The signal processing device 200 may comprise an adaptive feedback estimator 250. The adaptive feedback estimator 250 may comprise at least one processor. The at least one processor may comprise a first processor 261 and a second processor 262. The first processor 261 may be configured to process at a first rate. The first rate may be on the order of 1 millisecond. The second processor 262 may be configured to process at a second rate. The second rate may be greater than the first rate. The second rate may be a plurality of multiples of the first rate. The first processor 261 may, for example, comprise a Digital Signal Processor (DSP). The second processor 262 may, for example, comprise an Advanced RISC Machine (ARM). The adaptive feedback estimator 250 may comprise at least one machine readable medium 265. The at least one machine readable medium 265 may collectively comprise instructions configured to cause the first processor 261 to generate a feedback estimation signal through employment of an AFC filter on the output signal 212 at block 276. The instructions may be further configured to cause the first processor 261 to subtract the feedback estimation signal from the input signal 202 to produce the feedback compensated signal 287 at block 277. The instructions may be further configured to cause the second processor 262 to estimate at least one feedback path characteristic at block 271. The instructions may be further configured to cause the second processor 262 to construct the AFC filter based at least in part on the at least one feedback path characteristic at block 272. The instructions may be further configured to cause the second processor 262 to select a value for variable p in a diversity measure norm at block 273. The value may be greater than 0 and less than or equal to 2. The instructions may be further configured to cause the second processor 262 to compute an update rule for the AFC filter at block 274. The update rule may be based on the diversity measure norm. The instructions may be further configured to cause the second processor 262 to apply the update rule to the AFC filter at block 275.

Figure 3:
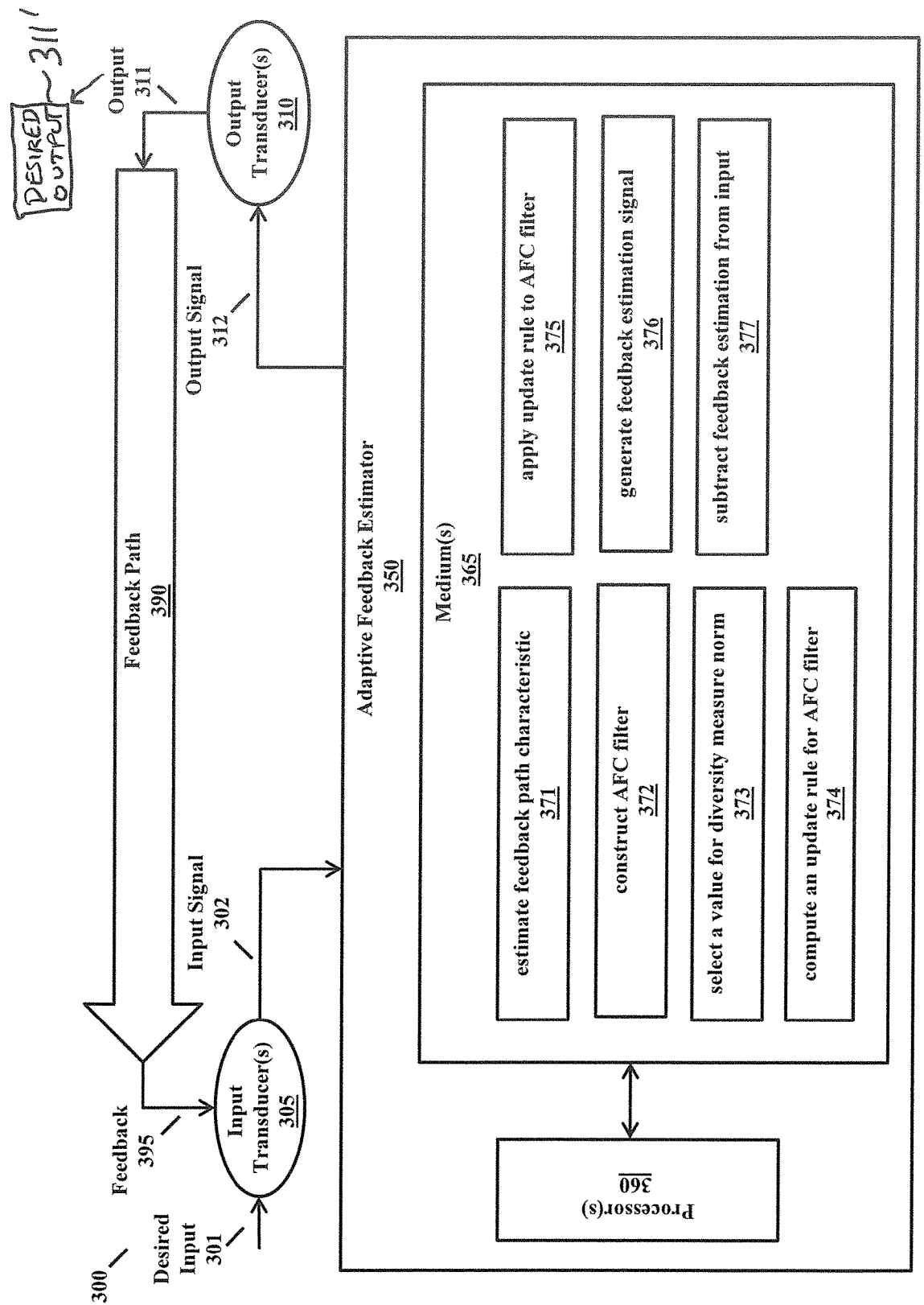
FIG. 3 is an example block diagram showing a signal processing system as per an aspect of an embodiment.

FIG. 3 is an example block diagram showing a signal processing system 300 as per an aspect of an embodiment. According to some of the various embodiments, a signal processing system 300 may comprise at least one input transducer 305. The at least one input transducer 305 may be configured to convert an input to an input signal 302. The input may comprise at least a desired input 301 and feedback 395. The feedback 395 may comprise at least a modified or unmodified portion of an output 311 (desired output 311' is also shown). The output 311 may propagate wirelessly through a feedback path 390. Propagation of the output 311 through the feedback path 390 may cause modification (e.g. attenuation, interference, and/or phase shifting) of at least a portion of the output 311. The signal processing system 300 may comprise at least one output transducer 310. The at least one output transducer 310 may be configured to convert an output signal 312 to an output 311. The signal processing system 300 may comprise an adaptive feedback estimator 350. The adaptive feedback estimator 350 may comprise at least one processor 360. The adaptive feedback estimator 350 may comprise at least one machine readable medium 365. The at least one machine readable medium 365 may collectively comprise instructions configured to cause the at least one processor 360 to estimate at least one feedback path characteristic at block 371. The instructions may be further configured to cause the at least one processor 360 to construct an AFC filter at block 372. The AFC filter may be based at least in part on the at least one feedback path characteristic. The instructions may be further configured to cause the at least one processor 360 to select a value for variable p in a diversity measure norm at block 373. The value may be greater than 0 and less than or equal to 2. The instructions may be further configured to cause the at least one processor 360 to compute an update rule for the AFC filter at block 374. The update rule may be based on the diversity measure norm. The instructions may be further configured to cause the at least one processor 360 to apply the update rule to the AFC filter at block 375. The instructions may be further configured to cause the at least one processor 360 to generate a feedback estimation signal through employment of the AFC filter on the output signal 312 at block 376. The instructions may be further configured to cause the at least one processor 360 to subtract the feedback estimation signal from the input signal 302 to produce a feedback compensated signal at block 377. The feedback compensated signal may be employed by at least one amplifier to generate the output signal 312.

Figure 4:
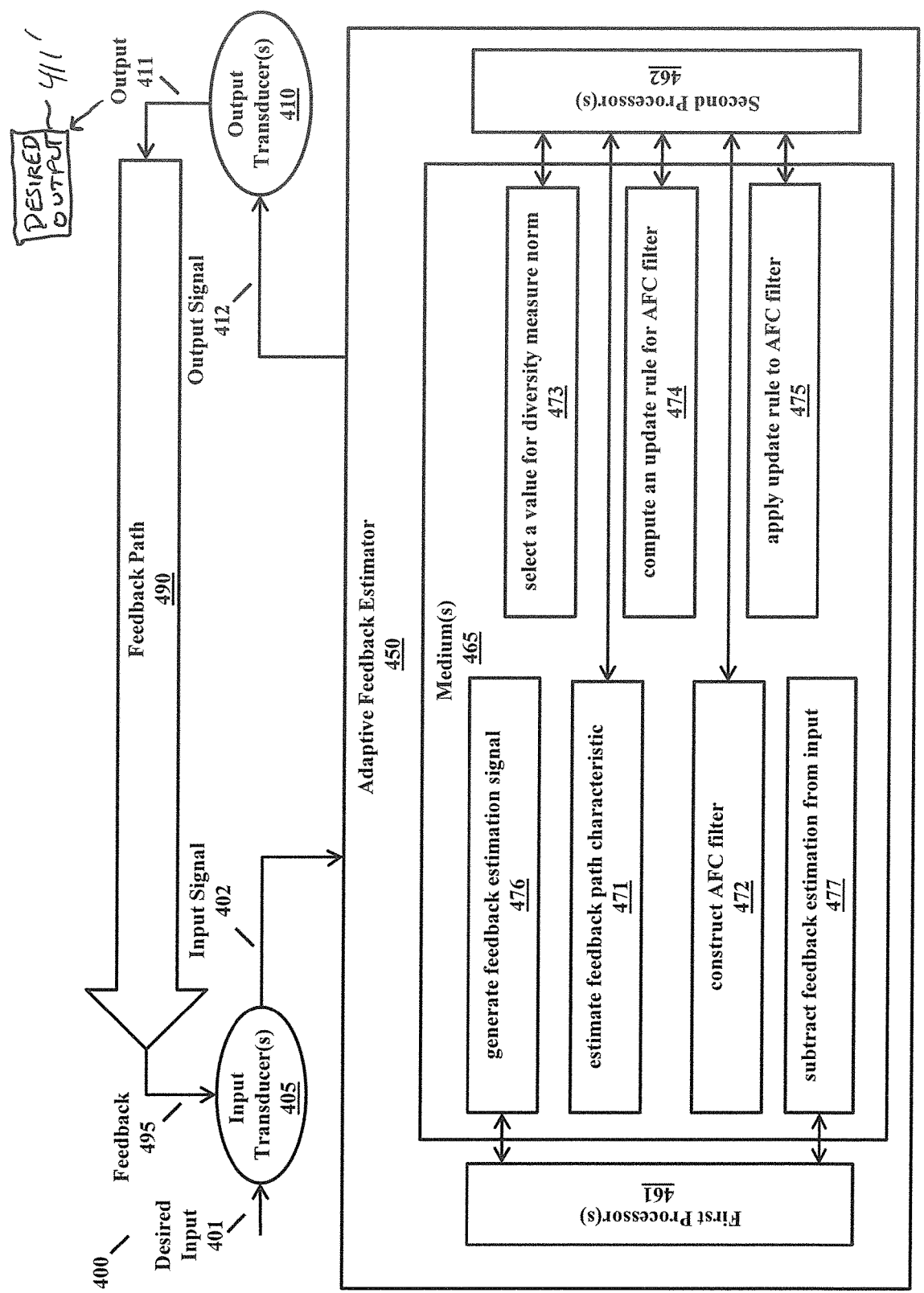
FIG. 4 is an example block diagram showing a signal processing system as per an aspect of an embodiment.

FIG. 4 is an example block diagram showing a signal processing system 400 as per an aspect of an embodiment. Signal processing system 400 may comprise at least one input transducer 405. The at least one input transducer 405 may be configured to convert an input to an input signal 402. The input may comprise at least a desired input 401 and feedback 495. The feedback 495 may comprise at least a modified or unmodified portion of an output 411 (desired output 411' is also shown). The output 411 may propagate wirelessly through a feedback path 490. Propagation of the output 411 through the feedback path 490 may cause modification (e.g. attenuation, interference, and/or phase shifting) of at least a portion of the output 411. The input signal 402 may, for example, comprise an audio signal, a speech signal, a sensor signal, harmonics thereof, combinations thereof, and/or the like. The signal processing system 400 may comprise at least one output transducer 410. The at least one output transducer 410 may be configured to convert an output signal 412 to the output 411. The output 411 may, for example, comprise audio, speech, physical artifacts sensed by the input transducer 405, combinations thereof, and/or the like. The signal processing system 400 may comprise an adaptive feedback estimator 450. The adaptive feedback estimator 450 may comprise at least one processor. The at least one processor may comprise a first processor 461 and a second processor 462. The first processor 461 may be configured to process at a first rate. The first rate may be on the order of 1 millisecond. The second processor 462 may be configured to process at a second rate. The second rate may be greater than the first rate. The second rate may be a plurality of multiples of the first rate. The first processor 461 may, for example, comprise a digital signal processor (DSP). The second processor 462 may, for example, comprise an advanced RISC machine (ARM). The adaptive feedback estimator 450 may comprise at least one machine readable medium 465. The at least one machine readable medium 465 may collectively comprise instructions configured to cause the first processor 461 to generate a feedback estimation signal through employment of an AFC filter on the output signal 412 at block 476. The instructions may be further configured to cause the first processor 461 to subtract the feedback estimation signal from the input signal 402 to produce a feedback compensated signal at block 477. The feedback compensated signal may be employed by at least one amplifier to generate the output signal 412. The instructions may be further configured to cause the second processor 462 to estimate at least one feedback path characteristic at block 471. The instructions may be further configured to cause the second processor 462 to construct the AFC filter based at least in part on the at least one feedback path characteristic at block 472. The instructions may be further configured to cause the second processor 462 to select a value for variable p in a diversity measure norm at block 473. The value may be greater than 0 and less than or equal to 2. The instructions may be further configured to cause the second processor 462 to compute an update rule for the AFC filter at block 474. The update rule may be based on the diversity measure norm. The instructions may be further configured to cause the second processor 462 to apply the update rule to the AFC filter at block 475.

Figure 5:
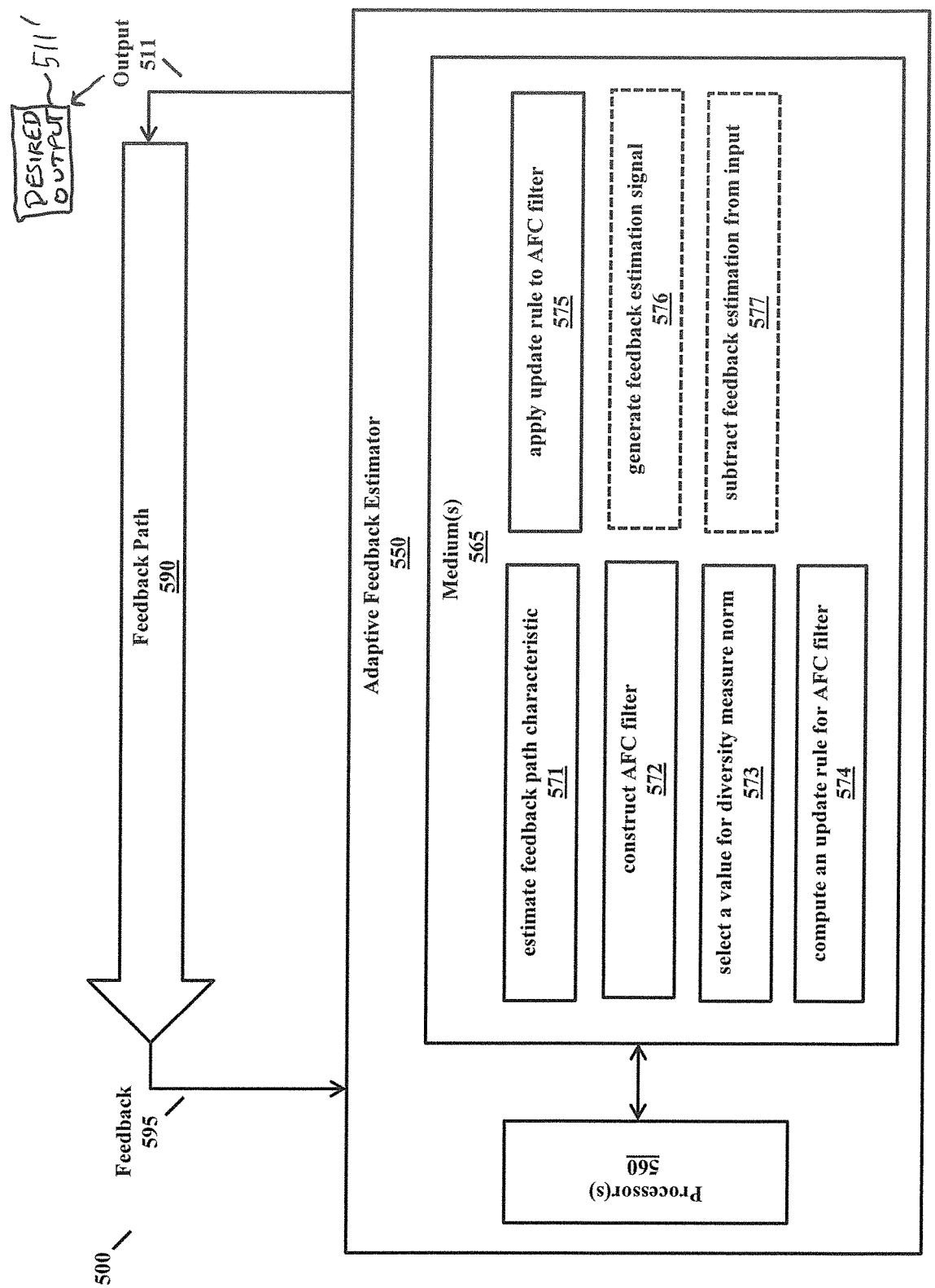
FIG. 5 is an example block diagram showing an adaptive feedback estimator environment as per an aspect of an embodiment.

FIG. 5 is an example block diagram showing an adaptive feedback estimator environment 500 as per an aspect of an embodiment. The adaptive feedback estimator environment 500 may comprise a feedback path 590. An output 511 may propagate wirelessly through the feedback path 590 (desired output 511' is also shown). Propagation of the output 511 through the feedback path 590 may cause modification (e.g. attenuation, interference, and/or phase shifting) of at least a portion of the output 511. Feedback 595 may comprise at least a modified or unmodified portion of the output 511. The adaptive feedback estimator environment 500 may comprise an adaptive feedback estimator 550. The adaptive feedback estimator 550 may comprise at least one processor 560. The adaptive feedback estimator 550 may comprise at least one machine readable medium 565. The at least one machine readable medium 565 may collectively comprise instructions configured to cause the at least one processor 560 to estimate at least one feedback path characteristic of the feedback path 590 at block 571. The instructions may be further configured to cause the at least one processor 560 to construct an AFC filter at block 572. The AFC filter may be based at least in part on the at least one feedback path characteristic. The instructions may be further configured to cause the at least one processor 560 to select a value for variable p in a diversity measure norm at block 573. The value may be greater than 0 and less than or equal to 2. The instructions may be further configured to cause the at least one processor 560 to compute an update rule for the AFC filter at block 574. The update rule may be based on the diversity measure norm. The instructions may be further configured to cause the at least one processor 560 to apply the update rule to the AFC filter at block 575. The instructions may be further configured to cause the at least one processor 560 to generate a feedback estimation signal through employment of the AFC filter on an output signal at block 576. The instructions may be further configured to cause the at least one processor 560 to subtract the feedback estimation signal from an input signal to produce a feedback compensated signal at block 577. The feedback compensated signal may be employed by at least one amplifier to generate the output signal.

Some of the various embodiments may be based, at least in part, on a feedback path characteristic. The feedback path characteristic may be based, at least in part, on at least one environment characteristic. Example factors that may impact the at least one environment characteristic include the type, number, and location of inputs in a system or device employing an adaptive feedback estimator. The type, number, and location of outputs in a system or device employing the adaptive feedback estimator may also impact the at least one environment characteristic. Specifically, the location of at least one input to the location of at least one output may significantly impact the at least one environment characteristic. In an example application of the adaptive feedback estimator employed in a hearing aid device or system, the input may comprise at least one microphone and the output may comprise at least one speaker. In this example, one of the at least one feedback path characteristic may be based on no obstruction between the input and the output. In this example, one of the at least one environment characteristic may comprise a mobile device. In this example, one of the at least one feedback path characteristic may be based on the proximity of the mobile device to the input and/or the output. Additional examples of the at least one environment characteristic include articles of clothing such as hats, scarves, headscarves, combinations thereof, and/or the like. In this example, one of the at least one feedback path characteristic may be based on the type of material in the article of clothing. In this example, one of the at least one feedback path characteristic may be based on the proximity of the article of clothing to the input and/or the output. Additional examples of the at least one environment characteristic include a structure. In this example, one of the at least one feedback path characteristic may be based on the type of material(s) employed by the structure. In this example, one of the at least one feedback path characteristic may be based on the proximity of the structure to the input and/or the output.

Some of the various embodiments may comprise a value for a variable of a diversity measure norm. The diversity measure norm is commonly expressed asp-norm or $\square_p$ norm. $\square_p$ norm is a subset of vector norms in mathematics. $l_p$ norm measures the distance of a vector from the origin in different ways (controlled by the variable p). In the field of sparse signal processing, $\square_p$ norm can serve as a "diversity measure" of a solution vector. This means the norm can be employed as a measure of diversity (and therefore a measure of sparsity) of a signal. In the present disclosure, the diversity measure norm may be employed by an update rule to promote sparsity when applied to an AFC filter. The higher the value of the variable p in the diversity measure norm, the less sparsity promoted. The value of the variable p in the diversity measure norm may be based on a feedback path characteristic.

According to some of the various embodiments, an adaptive feedback estimator may comprise at least one processor. The adaptive feedback estimator may comprise at least one machine readable medium. The at least one machine readable medium may collectively comprise instructions configured to cause the at least one processor to select a value for a diversity measure norm. The value may be greater than 0 and less than or equal to 2. The value may be selected from a plurality of values. The plurality of values may comprise three or greater values. The plurality of values may be based on measurements of at least one feedback path. The measurements may comprise measured feedback responses. The measurements may be measured in at least one environment and/or in at least one simulated environment. Each of the at least one environment may be summarized by at least one environment characteristic. Data related to the at least one environment characteristic may be stored in at least one environment variable.

Figure 6:
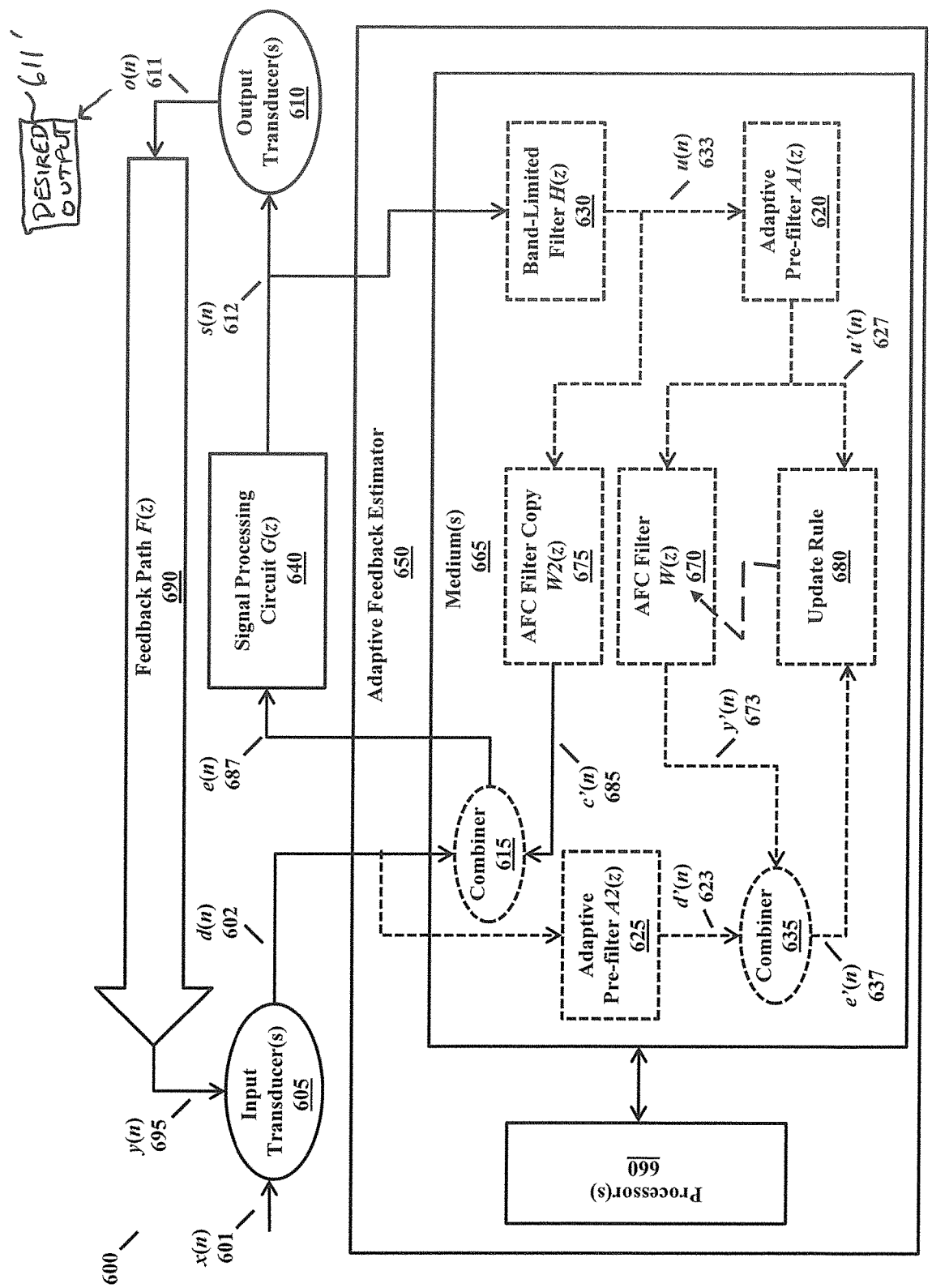
FIG. 6 is an example block diagram showing a signal processing device as per various aspects of various embodiments.

FIG. 6 is an example block diagram showing a signal processing device 600 as per various aspects of various embodiments. The signal processing device 600 may comprise at least one input transducer 605. The at least one input transducer 605 may be configured to convert an input to an input signal d(n) 602. A microphone may comprise the at least one input transducer 605. The input may comprise at least a desired input x(n) 601 and feedback y(n) 695. The feedback y(n) 695 may comprise at least a modified or unmodified portion of an output o(n) 611 (desired output 611' is also shown). The output o(n) 611 may propagate wirelessly through a feedback path F(z) 690. Propagation of the output o(n) 611 through the feedback path F(z) 690 may cause modification (e.g. attenuation, interference, and/or phase shifting) of at least a portion of the output o(n) 611. The input signal d(n) 602 may, for example, comprise an audio signal, a speech signal, a sensor signal, harmonics thereof, combinations thereof, and/or the like. The signal processing device 600 may comprise at least one output transducer 610. The at least one output transducer 610 may be configured to convert an output signal s(n) 612 to the output o(n) 611. The output o(n) 611 may, for example, comprise audio, speech, physical artifacts sensed by the input transducer 605, combinations thereof, and/or the like. The signal processing device 600 may comprise a signal processing circuit G(z) 640. The signal processing circuit G(z) 640 may be configured to at least amplify at least a portion of a feedback compensated signal e(n) 687 to generate the output signal s(n) 612. The signal processing device 600 may comprise an adaptive feedback estimator 650. The adaptive feedback estimator 650 may comprise at least one processor 660. The adaptive feedback estimator 650 may comprise at least one machine readable medium 665.

At least one machine readable medium 665 may collectively comprise instructions configured to cause at least one processor 660 to construct a band-limited filter H(z) 630. The band-limited filter H(z) 630 may be constructed as a high pass filter. The band-limited filter H(z) 630 may be configured to filter an output signal s(n) 612. The instructions may be further configured to cause the at least one processor 660 to construct an adaptive pre-filter A1(z) 620. The adaptive pre-filter A1(z) 620 may be configured to filter band-limited signal u(n) 633 which is the output from the band-limited filter H(z) 630. The instructions may be further configured to cause the at least one processor 660 to construct an AFC filter W(z) 670. The AFC filter W(z) 670 may be configured to filter the output of the adaptive pre-filter A1(z) 620. The instructions may be further configured to cause the at least one processor 660 to construct an adaptive pre-filter A2(z) 625. The adaptive pre-filter A2(z) 625 may be a duplicate construction of the adaptive pre-filter A1(z) 620. The adaptive pre-filter A2(z) 625 may be configured to filter the input signal d(n) 602. The instructions may be further configured to cause the at least one processor 660 to construct a combiner 635. The combiner 635 may be configured to combine pre-filtered input signal d'(n) 623, which is the output of the adaptive pre-filter A2(z) 625, with a negative of feedback approximation signal y'(n) 673, which is the output of the AFC filter W(z) 670. In other words, the combiner 635 may be configured to subtract the feedback approximation signal y'(n) 673 from the pre-filtered input signal d'(n) 623. The instructions may be further configured to cause the at least one processor 660 to select a value for variable p in a diversity measure norm. The instructions may be further configured to cause the at least one processor 660 to construct an update rule 680. The update rule 680 may be based on the diversity measure norm. The update rule 680 may be based on pre-filtered output signal u'(n) 627 which is the output of the adaptive pre-filter A1(z) 620. The update rule 680 may be based on combined signal e'(n) 637 which is the output of the combiner 635. The instructions may be further configured to cause the at least one processor 660 to employ the update rule 680 to update the AFC filter W(z) 670. The instructions may be further configured to cause the at least one processor 660 to construct an AFC filter copy W2(z) 675. The AFC filter copy W2(z) 675 may be a duplicate construction of the AFC filter W(z) 670. The AFC filter copy W2(z) 675 may be configured to filter the band-limited signal u(n) 633. The instructions may be further configured to cause the at least one processor 660 to employ the AFC filter copy W2(z) 675 to generate a feedback estimation signal c'(n) 685. The instructions may be further configured to cause the at least one processor 660 to construct a combiner 615. The combiner 615 may be configured to combine the input signal d(n) 602 with a negative of the feedback estimation signal c'(n) 685. In other words, the combiner 615 may be configured to subtract the feedback estimation signal c'(n) 685 from the input signal d(n) 602 to produce the feedback compensated signal e(n) 687.

According to some of the various embodiments, a diversity measure norm of a vector v may be defined by the equation 700 in FIG. 7. The value of the variable p in the diversity measure norm may reflect the diversity of the vector v. The degree of sparsity enforced on a solution vector v may be based on a weight given to the diversity measure norm term and/or the value of the variable p in the diversity measure norm. The larger the weight or the smaller the value of the variable p in the diversity measure norm, the more sparsity is considered. Values for the variable p in the diversity measure norm may range from greater than 0 to less than or equal to 2.

According to some of the various embodiments, an update rule may be defined as: w(n+1)=w(n)+μ(n)P(n)u'(n)e'(n), where w represents an L-tap filter as defined by the equation 800 in FIG. 8; μ represents a step size parameter as defined by the equation 900 in FIG. 9, where ε is a small positive constant to prevent division by zero, and p is greater than zero and less than or equal to 2; P represents an L-by-L diagonal matrix configured to assign a weight independently to each step size for each filter tap as defined by the equation 1000 in FIG. 10, where c is a small positive constant for any filter tap that would otherwise equal zero; u' represents a data vector consisting of current and past L−1 samples of a pre-filtered output signal (e.g. 627) as defined by the equation 1100 in FIG. 11; and e' is a pre-filtered input signal (e.g. 637). The pre-filtered input signal may be combined with a negative output of an AFC filter.

According to some of the various embodiments, an adaptive feedback estimator may comprise at least one processor. The adaptive feedback estimator may comprise at least one machine readable medium. The at least one machine readable medium may collectively comprise instructions configured to cause the at least one processor to compute a sparsity score. The sparsity score may be based on at least one real-time measurement employed to estimate at least one feedback path characteristic. The sparsity score ζ may be computed by applying the equation 1200 in FIG. 12 to a vector w. The vector w may comprise an updated AFC filter w(n+1). The instructions may be further configured to cause the at least one processor to employ the sparsity score to select the value from a plurality of values. The plurality of values may be based, at least in part, on measurements of at least one feedback path. The plurality of values may be based, at least in part, on measurements of at least one feedback response. The plurality of values may be configured to represent p for a range of sparsity degree as defined in the equation 1300 in FIG. 13 where lb defines a lower bound and ub defines an upper bound.

According to some of the various embodiments, an adaptive feedback estimator may comprise at least one processor. The adaptive feedback estimator may comprise at least one machine readable medium. The at least one machine readable medium may collectively comprise instructions configured to cause the at least one processor to compute an update rule for an AFC filter. The update rule may be based on a diversity measure norm. The update rule may be configured to compute a weight for a step size for each of a plurality of filter taps of the AFC filter. The weight may be a positive number. The update rule may employ an L-by-L diagonal matrix as defined by the equation 1000 and configured to compute the weight for the step size for each of the plurality of filter taps.

According to some of the various embodiments, an adaptive feedback estimator may comprise at least one processor. The adaptive feedback estimator may comprise at least one machine readable medium. The at least one machine readable medium may collectively comprise instructions configured to cause the at least one processor to compute an update rule for an AFC filter. The update rule may be based on a sparsity score. The instructions may be further configured to cause the at least one processor to apply the update rule to each coefficient of the AFC filter.

While the above description has described one application of the LMS with the improved update rule where p is not equal to 1 or 2, i.e., in the field of adaptive feedback, other applications will also be understood. For example, systems and methods according to present principles may be employed in beamforming.

Another application of the updated LMS with p not equal to 0, 1, or 2 includes sparsity promoting adaptive beamforming algorithms for hearing aids. In one implementation, a two microphone or multi-microphone adaptive beamforming system is employed for hearing aids encompassing a generalized side lobe canceler (GSC) wideband beam former along with the sparsity promoting LMS (SLMS) algorithms described above.

Figure 14:
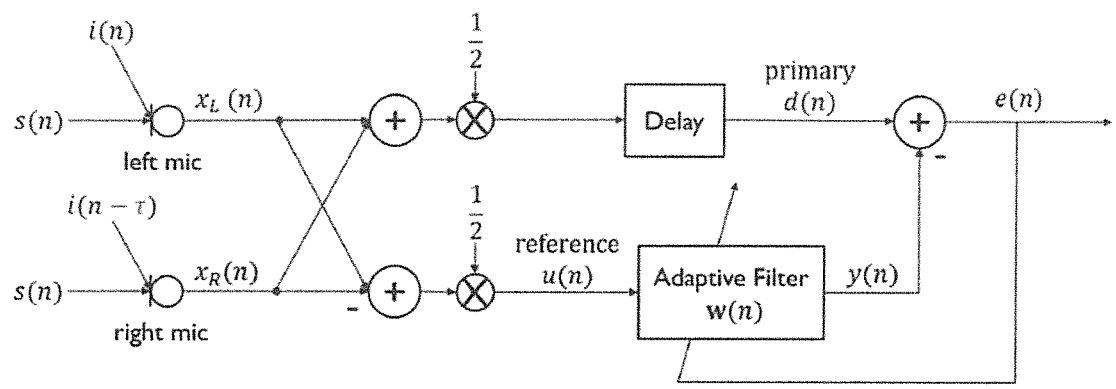
FIG. 14 illustrates an exemplary block diagram of a basic two microphone generalized side lobe canceller (GSC) beamforming system for a hearing aid.

FIG. 14 illustrates an exemplary block diagram of a basic two microphone GSC beamforming system for a hearing aid.

Figures 15A, 15B:
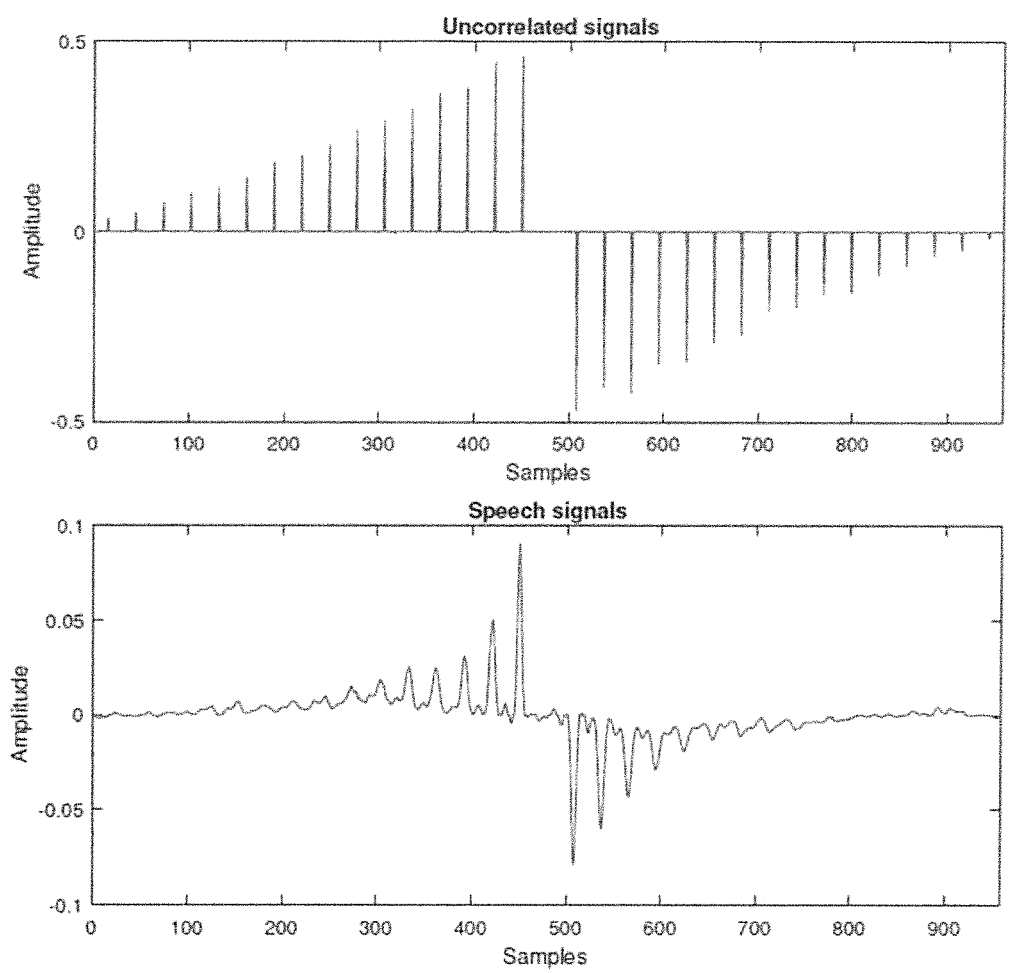
FIGS. 15A and 15B illustrates the adaptive filter coefficients of the two microphone GSC at convergence.

In this system is the sum of the two microphone signals (left and right) constitutes a primary signal with a finite delay. The difference of the two microphone signals constitutes the reference signal. LMS algorithms as described above may be employed to update the adaptive filter coefficients. FIGS. 15A and 15B illustrates the adaptive filter coefficients of the two microphone GSC at convergence.

The SLMS for filter adaptation in the GSC may be shown by:

$$w(n+1) = w(n) + \frac{\mu}{L\sigma^2(n) + \epsilon} P(n)u(n)e(n),$$

where $$P(n) = \text{diag}\{p_0(n), p_1(n), \ldots, p_{L-1}(n)\}$$

And P(n) is called the "step size control matrix". For the SLMS of:

$$p_l(n) = \frac{(|w_l(n)| + c)^{2-p}}{\frac{1}{L}\sum_{i=0}^{L-1}(|w_i(n)| + c)^{2-p}}, p \in (0, 2].$$

The inventors have found that p in between 1 and 2 suitable for GSC beamforming in hearing aids.

Figure 16:
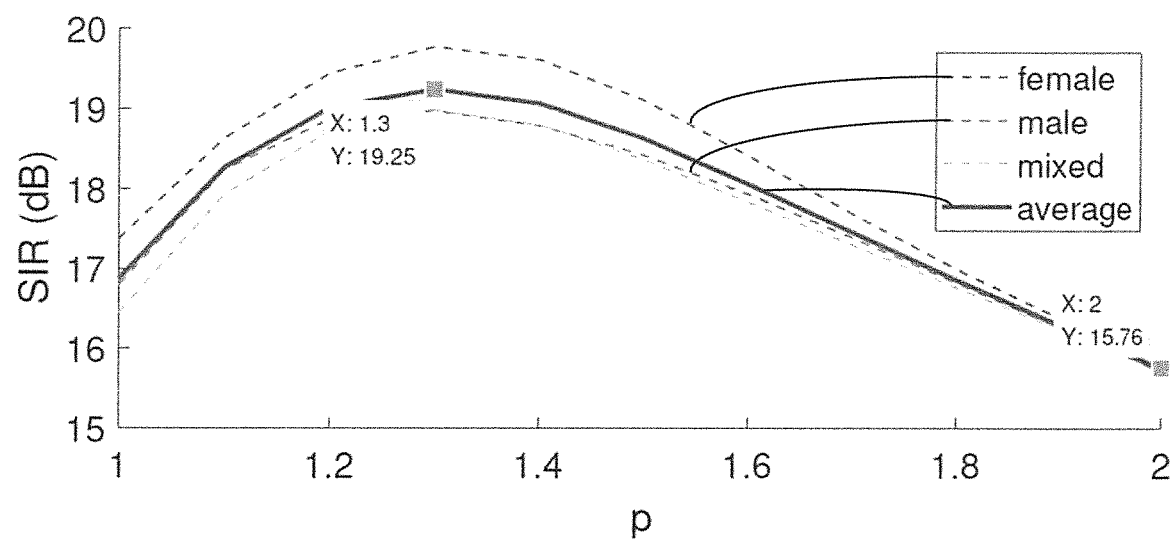
FIG. 16 illustrates the signal to interference ratio (SIR) versus p value in the application of SLMS to GSC.

FIG. 16 illustrates the signal to interference ratio versus p value in the application of SLMS to GSC.

Figure 17:
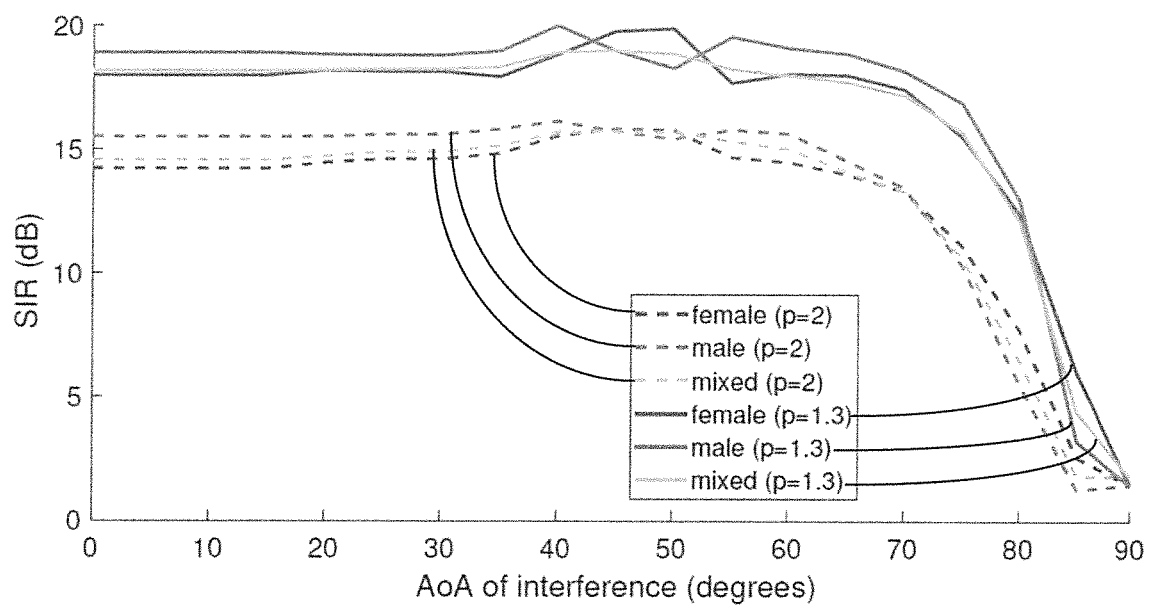
FIG. 17 illustrates the signal to interference ratio versus the angle of arrival (AoA) of the interference for different p, i.e., p=2 and p=1.3.

FIG. 17 illustrates the signal to interference ratio versus the angle of arrival (AoA) of the interference for different p, i.e., p=2 and p=1.3.

The GSC with SLMS can be further extended to multi-microphone beamforming systems with a suitably designed blocking matrix as will be understood. Sparsity is then promoted via SLMS in each of the adaptive filters deployed in the multi-microphone GSC beamformer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In this specification, "a" and "an" and similar phrases are to be interpreted as "at least one" and "one or more." References to "a", "an", and "one" are not to be interpreted as "only one". References to "an" embodiment in this disclosure are not necessarily to the same embodiment.

Many of the elements described in the disclosed embodiments may be implemented as modules. A module is defined here as an isolatable element that performs a defined function and has a defined interface to other elements. The blocks described in this disclosure may be implemented as modules in hardware, a combination of hardware and software, firmware, wetware (i.e. hardware with a biological element) or a combination thereof, all of which are behaviorally equivalent. For example, modules may be implemented using computer hardware in combination with software routine(s) written in a computer language (MATLAB, Java, HTML, XML, PHP, Python, ActionScript, JavaScript, Ruby, Prolog, SQL, VBScript, Visual Basic, Perl, C, C++, Objective-C or the like). Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs), field programmable gate arrays (FPGAs), and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

Some embodiments may employ processing hardware. Processing hardware may include one or more processors, computer equipment, embedded system, machines and/or the like. The processing hardware may be configured to execute instructions. The instructions may be stored on a machine-readable medium. According to some embodiments, the machine-readable medium (e.g. automated data medium) may be a medium configured to store data in a machine-readable format that may be accessed by an automated sensing device. Examples of machine-readable media include: magnetic disks, cards, flash memory, memory cards, electrically erasable programmable read-only memory (EEPROM), solid state drives, optical disks, barcodes, magnetic ink characters, and/or the like.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. Additionally, it should be noted that, for example purposes, several of the various embodiments may employ instructions operating in conjunction with hardware devices. However, one skilled in the art will recognize that many various languages and frameworks may be employed to build and use embodiments of the present disclosure. For example, languages/frameworks may be based upon MATLAB, Java, HTML, XML, PHP, Python, ActionScript, JavaScript, Ruby, Prolog, SQL, VBScript, Visual Basic, Perl, C, C++, Objective-C combinations thereof, and/or the like.

In this specification, various embodiments are disclosed. Limitations, features, and/or elements from the disclosed example embodiments may be combined to create further embodiments within the scope of the disclosure.

In addition, it should be understood that any figures that highlight any functionality and/or advantages, are presented for example purposes only. The disclosed architecture is sufficiently flexible and configurable, such that it may be utilized in ways other than that shown. For example, instructions listed in any block may be re-ordered, combined with other instructions, or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A signal processing device comprising: at least one input transducer configured to convert an input to an input signal; at least one output transducer configured to convert an output signal to an output; a signal processing circuit configured to at least amplify at least a portion of a feedback compensated signal to generate the output signal; and an adaptive feedback estimator comprising: at least one processor; and at least one machine readable medium collectively comprising instructions configured to cause the at least one processor to: estimate at least one feedback path characteristic; construct an adaptive feedback cancellation filter based at least in part on the at least one feedback path characteristic; select a value for variable p in a diversity measure norm, the value not equal to 1 or 2; compute an update rule for the adaptive feedback cancellation filter, the update rule based on the diversity measure norm; apply the update rule to the adaptive feedback cancellation filter; generate a feedback estimation signal through employment of the adaptive feedback cancellation filter on the output signal; and subtract the feedback estimation signal from the input signal to produce the feedback compensated signal.

2. The device according to claim 1, wherein the at least one processor comprises a first processor and a second processor, and wherein the instructions are further configured to cause the first processor to: generate the feedback estimation signal through employment of the adaptive feedback cancellation filter on the output signal; and subtract the feedback estimation signal from the input signal to produce the feedback compensated signal; and wherein the instructions are further configured to cause the second processor to: estimate the at least one feedback path characteristic; construct the adaptive feedback cancellation filter based at least in part on the at least one feedback path characteristic; select the value for the variable p in the diversity measure norm, the value not equal to 1 or 2; compute the update rule for the adaptive feedback cancellation filter, the update rule based on the diversity measure norm; and apply the update rule to the adaptive feedback cancellation filter.

3. The device according to claim 2, wherein the first processor is configured to process at a first rate.

4. The device according to claim 3, wherein the second processor is configured to process at a second rate greater than the first rate.

5. The device according to claim 2, wherein the first processor comprises a Digital Signal Processor (DSP).

6. The device according to claim 2, wherein the second processor comprises an Advanced RISC Machine (ARM).

7. The device according to claim 1, wherein the instructions are further configured to cause the at least one processor to select the value from a plurality of values, the plurality of values based on measurements of at least one feedback path.

8. The device according to claim 1, wherein the instructions are further configured to cause the at least one processor to select the value from a plurality of values, the plurality of values based on measurements of at least one feedback path in at least one environment.

9. The device according to claim 1, wherein the instructions are further configured to cause the at least one processor to compute a sparsity score.

10. The device according to claim 9, wherein the instructions are further configured to cause the at least one processor to employ the sparsity score to select the value from a plurality of values.

11. The device according to claim 1, wherein the update rule is configured to compute a weight for a step size for each of a plurality of filter taps of the adaptive feedback cancellation filter.

12. The device according to claim 1, wherein the instructions are further configured to cause the at least one processor to compute the update rule based on a sparsity score and apply the update rule to each coefficient of the adaptive feedback cancellation filter.

13. A signal processing system comprising: at least one input transducer configured to convert an input to an input signal; at least one output transducer configured to convert an output signal to an output; and an adaptive feedback estimator comprising: at least one processor; and at least one machine readable medium collectively comprising instructions configured to cause the at least one processor to: estimate at least one feedback path characteristic; construct an adaptive feedback cancellation filter based at least in part on the at least one feedback path characteristic; select a value for variable p in a diversity measure norm, the value not equal to 1 or 2; compute an update rule for the adaptive feedback cancellation filter, the update rule based on the diversity measure norm; apply the update rule to the adaptive feedback cancellation filter; generate a feedback estimation signal through employment of the adaptive feedback cancellation filter on the output signal; and subtract the feedback estimation signal from the input signal to produce a feedback compensated signal.

14. The system according to claim 13, wherein the at least one processor comprises a first processor and a second processor, and wherein the instructions are further configured to cause the first processor to: generate the feedback estimation signal through employment of the adaptive feedback cancellation filter on the output signal; and subtract the feedback estimation signal from the input signal to produce the feedback compensated signal; and wherein the instructions are further configured to cause the second processor to: estimate the at least one feedback path characteristic; construct the adaptive feedback cancellation filter based at least in part on the at least one feedback path characteristic; select the value for the variable p in the diversity measure norm, the value not equal to 1 or 2; compute the update rule for the adaptive feedback cancellation filter, the update rule based on the diversity measure norm; and apply the update rule to the adaptive feedback cancellation filter.

15. The device according to claim 13, wherein the first processor is configured to process at a first rate.

16. The device according to claim 15, wherein the second processor is configured to process at a second rate greater than the first rate.

17. The device according to claim 13, wherein the first processor comprises a Digital Signal Processor (DSP).

18. The device according to claim 13, wherein the second processor comprises an Advanced RISC Machine (ARM).

19. The system according to claim 13, wherein the instructions are further configured to cause the at least one processor to select the value from a plurality of values, the plurality of values based on measurements of at least one feedback path.

20. The system according to claim 13, wherein the instructions are further configured to cause the at least one processor to select the value from a plurality of values, the plurality of values based on measurements of at least one feedback path in at least one environment.

21. The system according to claim 13, wherein the instructions are further configured to cause the at least one processor to compute a sparsity score.

22. The system according to claim 21, wherein the instructions are further configured to cause the at least one processor to employ the sparsity score to select the value from a plurality of values.

23. The system according to claim 13, wherein the update rule is configured to compute a weight for a step size for each of a plurality of filter taps of the adaptive feedback cancellation filter.

24. The system according to claim 13, wherein the instructions are further configured to cause the at least one processor to compute the update rule based on a sparsity score and apply the update rule to each coefficient of the adaptive feedback cancellation filter.

25. An adaptive feedback estimator comprising: at least one processor; and at least one machine readable medium collectively comprising instructions configured to cause the at least one processor to: estimate at least one feedback path characteristic of a feedback path; construct an adaptive feedback cancellation filter based at least in part on the at least one feedback path characteristic; select a value for variable p in a diversity measure norm, the value not equal to 1 or 2; compute an update rule for the adaptive feedback cancellation filter, the update rule based on the diversity measure norm; and apply the update rule to the adaptive feedback cancellation filter.

26. The estimator according to claim 25, wherein the instructions are further configured to cause the at least one processor to select the value from a plurality of values, the plurality of values based on measurements of at least one feedback path.

27. The estimator according to claim 25, wherein the instructions are further configured to cause the at least one processor to select the value from a plurality of values, the plurality of values based on measurements of at least one feedback path in at least one environment.

28. The estimator according to claim 25, wherein the instructions are further configured to cause the at least one processor to compute a sparsity score.

29. The device according to claim 28, wherein the instructions are further configured to cause the at least one processor to employ the sparsity score to select the value from a plurality of values.

30. The estimator according to claim 25, wherein the update rule is configured to compute a weight to a step size for each of a plurality of filter taps of the adaptive feedback cancellation filter.

31. The estimator according to claim 25, wherein the instructions are further configured to cause the at least one processor to compute the update rule based on a sparsity score and apply the update rule to each coefficient of the adaptive feedback cancellation filter.

32. A method of operating a least mean square adaptive filtering algorithm, the improvement comprising updating the least mean square adaptive filtering algorithm, comprising: selecting a value for a variable p in a diversity measure norm, the value not equal to 1 or 2; computing an update rule for the least mean square adaptive filter, the update rule based on the diversity measure norm; applying the update rule to the least mean square adaptive filter; generating an estimation signal through employment of the least mean square adaptive filter on the output signal; and subtracting the estimation signal from the input signal to produce a modified signal.

* * * * *